US006605338B1

(12) United States Patent
Romanic et al.

(10) Patent No.: US 6,605,338 B1
(45) Date of Patent: Aug. 12, 2003

(54) SECURITY DOCUMENT OR DEVICE HAVING AN INTAGLIO CONTRAST EFFECT

(75) Inventors: Hermina Romanic, West Brunswick (AU); Wayne Kevin Jackson, Reservoir (AU)

(73) Assignee: Securency Pty Ltd, Craigieburn (AU)

( * ) Notice: Subject to any disclaimer, the term of this patent is extended or adjusted under 35 U.S.C. 154(b) by 0 days.

(21) Appl. No.: 09/806,966

(22) PCT Filed: Jun. 5, 2000

(86) PCT No.: PCT/AU00/00629

§ 371 (c)(1), (2), (4) Date: Apr. 5, 2001

(87) PCT Pub. No.: WO00/76784

PCT Pub. Date: Dec. 21, 2000

(30) Foreign Application Priority Data

Jun. 11, 1999 (AU) .............................................. PQ0958

(51) Int. Cl.[7] ................................................ B32B 27/14

(52) U.S. Cl. ......................... 428/195; 428/916; 283/57; 283/67; 283/72; 106/400; 101/492; 359/2

(58) Field of Search ................................. 428/195, 916; 283/67, 72, 57; 359/2; 106/400; 101/492

(56) References Cited

U.S. PATENT DOCUMENTS

| | | | | |
|---|---|---|---|---|
| 4,420,515 | A | | 12/1983 | Amon et al. |
| 4,434,259 | A | | 2/1984 | Gold et al. |
| 4,567,098 | A | | 1/1986 | Becker et al. |
| 5,653,792 | A | * | 8/1997 | Phillips et al. |
| 5,722,693 | A | * | 3/1998 | Wicker |
| 5,735,547 | A | * | 4/1998 | Morelle et al. |
| 5,876,068 | A | | 3/1999 | Schneider et al. |
| 5,964,936 | A | * | 10/1999 | Reisser |
| 6,098,546 | A | * | 8/2000 | Schell |

FOREIGN PATENT DOCUMENTS

| | | |
|---|---|---|
| AU | A-38653/93 | 12/1983 |
| AU | 199857410 B2 | 8/1998 |
| DE | 4226907 A1 | 2/1994 |
| JP | 3266-684 A | 11/1991 |
| JP | 07068981 A | 3/1995 |
| WO | WO 98/33658 | 8/1998 |

* cited by examiner

*Primary Examiner*—Cynthia H. Kelly
*Assistant Examiner*—Tamra L. Dicus
(74) *Attorney, Agent, or Firm*—Christensen O'Connor Johnson Kindness PLLC

(57) ABSTRACT

A security document or device having a substrate (2), a smooth highly reflective layer (1) applied to the substrate (2) and having a reflectivity of at least 60 gloss units, a raised printed image (3) of lines or dots applied to said reflective layer (1) by a printing process and having a height of about 10 to 100 μm, and typically about 30 μm, and a similar spacing being adjacent lines or dots, the hue chroma value of the ink used to print the image being between 30 and about 50 chroma units tending towards a saturation value of 60 chroma units, the lightness of the ink being at least 50 L degrees (lightness units), and typically between 70 and 100 L degrees.

40 Claims, 1 Drawing Sheet

SECURITY DOCUMENT OR DEVICE HAVING AN INTAGLIO CONTRAST EFFECT

This is a United States national stage application of International application No. PCT/AU00/00629, filed Jun. 5, 2000, the benefit of the filing date of which is hereby claimed under 35 U.S.C. §120, which in turn claims the benefit of Australian application No. PQ 0958, filed Jun. 11, 1999, the benefit of the filing date of which is hereby claimed under 35 U.S.C. §119.

FIELD OF THE INVENTION

This invention relates to security documents such as passport, bonds, banknotes, and security devices such as security passes and the like.

BACKGROUND OF THE INVENTION

The security industry is always looking for new manufacturing techniques, materials and effects which offer improved and or additional security and which will offer the "man on the street" greater assurance when exchanging such documents while also offering an aesthetically appealing document that people will look at.

Printed matter always has the problem of being copied or simulated by photocopying or scanning devices as well as simple printing techniques widely available in the commercial world. Therefore, devices that change colour or shape under various lighting conditions and or geometry make the task of counterfeiting or simulating the document much more difficult.

The introduction of the polymer security substrate has offered the perfect medium to produce secure devices in a cost effective and secure manner. As most high level security documents are already printed via the intaglio process, a well known method of printing which uses elevated temperatures and high pressures, 70°–90° C. at 25–30 Mpa, the machines and special inks for this process are only sold to bona fide security printers, which offers a degree of inherent security.

In our International Patent Application PCT/AU98/00046, we describe a printed security document or device including a reflective or brightly coloured base layer and a raised printed image applied to that layer by a printing process, at least part of the raised printed image having a height of at least 5 μm, the image being enhanced by the reflective or brightly coloured layer when viewed at different angles under different lighting conditions. Subsequent research on the effect created by this arrangement has revealed that it is important for best results for the base layer to be highly reflective and for the raised printed image to be printed in an ink having predetermined chroma and lightness.

SUMMARY OF THE INVENTION

The invention provides a security document or other device including a substrate, a smooth highly reflective layer applied to said substrate and having a reflectivity of at least 60 gloss units, and a raised printed image applied to said reflective layer by a printing process, at least part of said raised printed image having a height of at least 10 μm, said printed image being printed using ink of a hue having a chroma value of at least 30 chroma units and/or a lightness of at least 50 lightness units.

By producing the printed image on a highly reflective layer as defined above, the raised printed image is significantly enhanced when viewed at different angles and under different lighting conditions and is therefore able to produce in the document or device a security effect which is readily noticeable to the naked eye, will maintain its effectiveness for the life of the document and will satisfy the anti copy requirements of security documents such as banknotes.

The invention also provides a method of producing a security document or other device, including the steps of applying a smooth highly reflective layer to a substrate, said reflective layer having a reflectivity of at least 60 gloss units, and printing a raised printed image on the reflective layer, at least part of said raised printed having a height of at least 10 μm and being printed using ink of a hue having a chroma value of at least 30 chroma units and/or lightness of at least 50 L degrees (lightness units).

The smooth highly reflective layer can be applied by printing as part of the gravure printing process used to print security documents and devices, such as banknotes. If desired, other printing processes, such as silk screen printing, may be used to apply the layer. Alternatively, a substrate having the required reflectivity can be achieved by hot stamping of foil having the required reflectivity to the substrate.

Where the smooth highly reflective layer is applied by a printing process, it is applied in a manner which achieves a layer thickness of about 3 μm.

The layer is preferably restricted to a relatively small region or patch of the substrate defining the security document or other device to thereby define a specific security feature in the document or device.

The substrate is preferably a smooth substrate such as a laminated polymer material of the type used in the production of Australian banknotes, and manufactured and sold by the applicant under the trade mark GUARDIAN, or any other smooth surfaced polymer suitable for use in the production of security documents or devices. Although paper substrates are not as smooth as polymer substrates, acceptable results can be achieved by printing or laminating a reflective patch onto a paper substrate, which is then calendared by the subsequent intaglio printing process.

Where the smooth highly reflective layer is applied by printing, the ink used should incorporate selected pigments and binders which will enable the cured reflective surface to withstand chemical and physical attack over an extended period of time, comparable to the expected life of the document.

The printed image is preferably applied by intaglio printing, or although other known printing processes capable of producing raised lines or dots on the reflective layer may be used. The printed image will typically have an average height of about 10 μm to 100 μm, which is about the upper limit of the height which can be achieved using the intaglio printing process, a similar width, and a spacing or pitch between adjacent lines or dots should be in a ratio height to pitch of about 1:1 to 1:3. In a practical example, the lines/dots in the image will have a height of about of 20 to 30 μm, a similar width, and a pitch of about 30 μm.

The adoption of the ratio outlined above results in the reflective patch remaining reflective in nature when viewed with a light source from behind, and the patch will dominate the perception of the viewer's eyes. In addition, at lower viewing angles, there will still be enough of the surface of the patch in a non-reflective mode relative to the observer and the light source to give contrast to the relatively bright and reflective intaglio ink.

The intaglio ink used for printing the image should have a hue chroma value tending towards saturation: 60 chroma units. While the minimum chroma value should be about 30 chroma units, a practical chroma value to achieve best results will be at least 50 chroma units, which is relatively close to saturation. The lightness of the ink should similarly be greater than 50 L degrees, and the lightness will typically be of the order of 70 to 100 L degrees.

An appropriate lightness value can be achieved in an ink having the required hue and chroma values by the addition of a lightening agent such as $TiO_2$ to the ink. The amount of $TiO_2$ added to the ink will depend on the hue of the ink which is selected, and may vary from about 3% to about 10%.

The effects described above and below can be achieved to a certain extent by using pure colours in the intaglio inks, preferably hues located in the L*a*b* colour space quadrant as defined by Commission Internationale de I'Eclairage in 1976. However, for best results, the $TiO_2$ addition described above improves the opacity of the printed image sufficiently to hide the reflective patch and provides additional reflectance so as to be readily observable when the metallic reflective patch is viewed beyond the 40 degree window illustrated in FIG. 4. The addition of titanium dioxide, in the preferred embodiment to 4% at the expense of the filler calcium carbonate, the above criteria of opacity and reflective specifications are achieved without losing any lightness or hue saturation. The increased reflectance of such enhanced intaglio inks allow the intaglio image to be clearly observable at an angle other than the viewing window of the reflective patch.

BRIEF DESCRIPTION OF THE DRAWINGS

A preferred embodiment of the invention will now be described with reference to the accompanying drawings in which.

DESCRIPTION OF THE PREFERRED EMBODIMENTS

Figure 1:
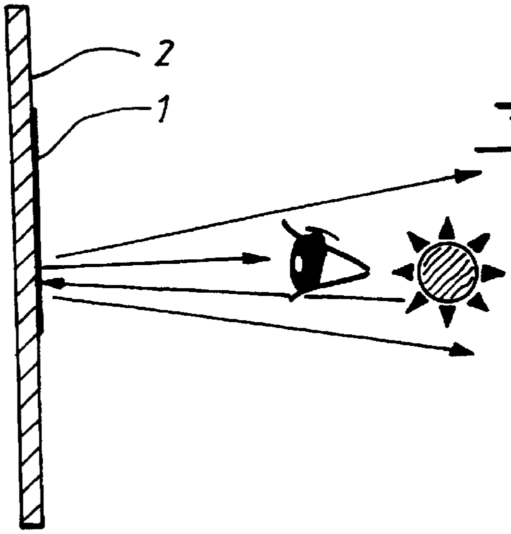
FIGS. 1 to 3 show schematically the manner in which the security document or other device embodying the invention functions.

In the preferred embodiments, metallic ink patches 1 are printed by the gravure printing process onto a smooth polymer substrate 2, such as any one of the substrates currently used in the production of polymer banknotes in Australia and overseas. The following preferred ink formulations and gravure engraving specifications will produce acceptable results.

To achieve the highly reflective surface, two systems (silver and gold) can be used. The formulations and gravure engraving specifications are as follows:

Silver Coloured Reflective Patch

| | | |
|---|---|---|
| Eckart Aluminium (PCA)-18% | Syloid | 308-0.5–1.0% |
| Resin (two pack polyurethane system)-35% | | Catalyst-5.3% |
| MIBK-3% | | |
| Add Ethyl Acetate to achieve a printing viscosity of 21–23 secs. using Zahn cup No. | | |

Gold Coloured Reflective Patch

| | |
|---|---|
| Eckart Gold (Rotoflex, Resist Grade Rich Pale Gold)-31% | |
| Resin (two pack polyurethane system)-29% | MIBK-3% |
| Syloid 308-0.5–1.0% | Catalyst 4.4% |

Add Ethyl Acetate to achieve a printing viscosity of 21–23 secs. using Zahn cup No. 2

The cylinder configuration used for these pigments is:

| | |
|---|---|
| Wall = 10 μm | Width = 200.1838 μm |
| Channel = 36 μm | Cell Depth = 57.78807 μm |
| Lines/cm = 59 μm | Stylus = 120° |
| Screen = 41.2 μm | |

To measure the specular reflectance, in percent ($R_S$), of these metallic surfaces, the following equation can be used:

$R_S$(percent)=

$$50\left[\left[\frac{\cos i-\sqrt{n^2-\sin^2 i}}{\cos i+\sqrt{n^2-\sin^2 i}}\right]^2+\left[\frac{n^2\cos i-\sqrt{n^2-\sin^2 i}}{n^2\cos i+\sqrt{n^2-\sin^2 i}}\right]^2\right]$$

where:

i=the specular (incidence) angle, and n=the index of refraction of the surface.

This formula can be found in ASTM Standard D 2457-97, Standard Test Method for Specular Gloss of Plastic Films and Solid Plastics.

A suitable instrument is the Micro-Tri-Gloss Meter which uses the above methodology to measure gloss units. The results are related to a highly polished black surface with a refractive index of 1.567.

Below are typical measurements for different substrates measured at a 45° angle:

| | |
|---|---|
| Matt white paper | 5.4 |
| Opacified "Guardian substrate ™" | 10.1 |
| Metallic Silver ink (on paper) | 20.4 |
| Silver on Opacified "Guardian substrate ™" | 102.3 |

Note: At a 45° angle, a perfect mirror measures 1000.

With Matt white paper, the light is reflected in the direction of specular reflection as well as other directions. The capacity of a surface to reflect a light source is significantly reduced. With opacified substrate, the surface is flatter and smoother however the light source is still reflected specularly. The metallic ink on paper is slightly better but the rougher surface still affects the reflective properties of the ink. On the other hand, the metallic ink on opacified "Guardian substrate™" is more reflective. The intensity of the reflected light is dependent on the angle of illumination and material properties.

A printed image 3 is applied to the reflective patch by means of the intaglio printing process using an ink having selected colour chroma values and lightness. Preferred ink formulations are detailed below in comparison with standard formulations of similar hues.

To make up 100 units of intaglio ink the formulation is as follows:

| Enhanced Formulation | | Standard Formulation | |
|---|---|---|---|
| Polyester resin | 36 | Polyester resin | 36 |
| Polyethylene wax | 5 | Polyethylene wax | 5 |
| Wax | 5 | Wax | 5 |
| Calcium Carbonate | 30 | Calcium Carbonate | 34 |
| Hydrocarbon Solvents | 8 | Hydrocarbon Solvents | 8 |
| Drier | 1 | Drier | 1 |
| CIBA Yellow, 2GLTE | 11 | CIBA Yellow, 2GLTE | 11 |
| $TiO_2$ | 4 | | |
| L = 83.52, a = −1.00, b = 4.56 | | L = 82.11, a = −4.59, b = 28.32 | |

Formulation for Another Intaglio Ink Colour is as Follows

| | | | |
|---|---|---|---|
| Polyester resin | 36 | Polyester resin | 36 |
| Polyethylene wax | 5 | Polyethylene wax | 5 |
| Wax | 5 | Wax | 5 |
| Calcium Carbonate | 30 | Calcium Carbonate | 34 |
| Hydrocarbon Solvents | 8 | Hydrocarbon Solvents | 8 |
| Drier | 1 | Drier | 1 |
| CIBA Green GLN | 11 | CIBA Green GLN | 11 |
| $TiO_2$ | 4 | | |
| L = 79.37, a = −6.97, b = 5.21 | | L = 66.99, a = −22.57, b = 9.12 | |

The addition of $TiO_2$ to the intaglio ink formulation increases reflectivity, while maintaining the opacity of the ink film. Indeed, the white ($TiO_2$) on its own, also produces a colour shift, just as effective as coloured pigments, and may therefore replace the pigment component in the above examples.

The desired effect is not as effective if there is less than 5 μm of intaglio ink, and this is the reason why intaglio or similar inks must be used rather than offset inks. The image should include a matrix of lines or dots 4, such as a portrait, a numeral, or a latent image. The height of the intaglio ink achieves two things: it ensures the opacity of the ink film and therefore no reflective ink from underneath the intaglio patch is viewable through the encased ink, and the height allows less of the intaglio patch to be viewed as the document is rotated with respect to the light source. The example of FIG. 4, the height of the ink is about 10 μm while the spacing between adjacent lines or dots 4 is about 30 μm giving a height to pitch ratio of 1:3 when the viewing angle is about 33.69°, as illustrated by the first arrow, the patch 1 is halved, while at an angle of 21.8°, the patch 1 disappears.

Figure 2:
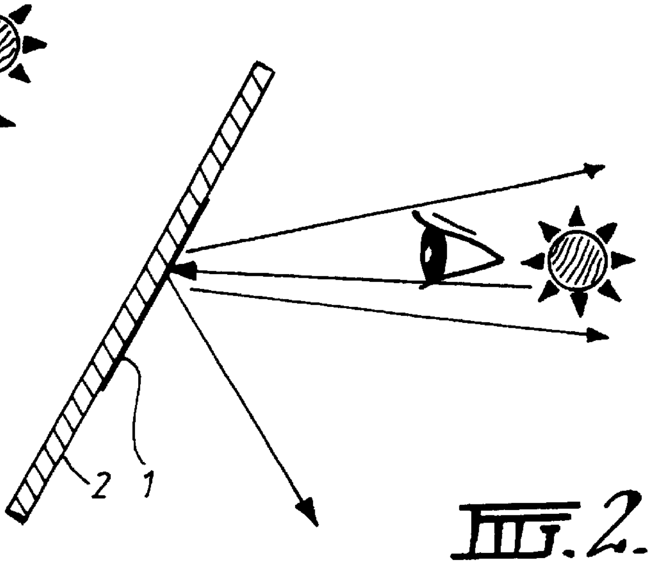
Figure 3A:
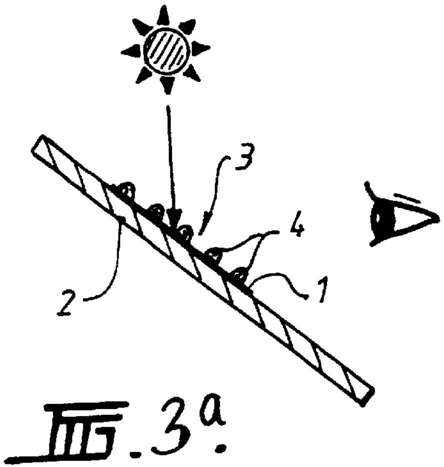
Figure 3B:
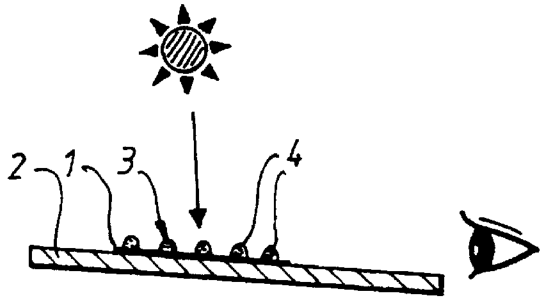
Figure 4:
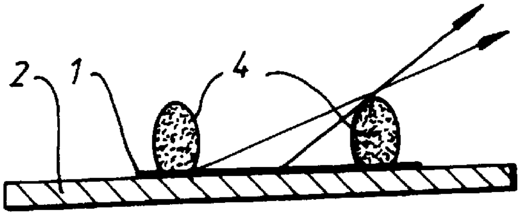
FIG. 4 is a sectional elevation of part of a security document embodying the invention illustrating a preferred example.

When the intaglio ink is printed on the reflective patch, as illustrated in FIG. 4 and the patch is viewed at an angle perpendicular to the light source, as illustrated in FIG. 1, the viewer will see two distinct colours, that of the highly reflective metallic patch, and the relatively pure colour of the intaglio ink. As the viewing angle is slowly changed as illustrated in FIGS. 2 and 3, from a perpendicular angle to a more oblique angle relative to the light source, the reflective metallic patch becomes duller, due to it being less reflective at that angle, and the intaglio pigment becomes brighter and more enhanced.

The substrate incorporating the reflective patch and enhanced intaglio ink must be capable of withstanding the rigours of physical wear and tear such as crumpling, soiling and abrasion, chemical attack such as mild caustic, water, dry cleaning and perspiration and finally, have very good light fastness over an extended period of time, comparable to the document's life.

What is claimed is:

1. A security document including a substrate, a smooth highly reflective layer applied to said substrate and having a specular reflectance percentage of at least 60, and a raised printed image applied to said reflective layer by a printing process, at least part of said raised printed image having a height of at least 10 μm, said printed image being printed using ink of a hue having a chroma value of at least 30 chroma units and/or a lightness of at least 50 lightness units.

2. The security document of claim 1 wherein the raised printed image includes lines or dots which have an average height from about 10 μm to about 100 μm a width from about 10 μm to about 100 μm, with the spacing or pitch between adjacent lines or dots being such that the ratio of height to pitch is from about 1:1 to about 1:3.

3. The security document of claim 2, wherein the raised printed image has an average height from about 20 to about 40 μm.

4. The security document of claim 3, wherein the raised printed image has an average height of about 30 μm.

5. The security document of claim 3, wherein the raised printed image has an average width from about 20 μm to about 40 μm.

6. The security document of claim 5, wherein the raised printed image has an average width of about 30 μm.

7. The security document of claim 5, wherein the raised printed image has an average width of about 30 μm.

8. The security document of claim 3, wherein the average spacing or pitch between adjacent lines or dots is about 30 μm.

9. The security document of claim 3, wherein the raised printed image has an average height of about 30 μm.

10. The security document of claim 3, wherein the raised printed image has an average width from about 20 μm to about 40 μm.

11. The security document of claim 3, wherein the average spacing or pitch between adjacent lines or dots is about 30 μm.

12. The security document of claim 1 or claim 2, wherein the hue chroma value of the ink used to print the printed image is in the range of 30 chroma units to about 60 chroma units.

13. The security document of claim 12, wherein the lightness of the ink is from about 70 to about 100 lightness units.

14. The security document of claim 12, wherein the lightness of the ink is from about 70 to about 100 lightness units.

15. The security document of claim 1 or claim 2, wherein the smooth highly reflective layer is restricted to a region or patch of the substrate to thereby define a region specific security feature in the document.

16. The security document of claim 1 or claim 2, wherein the smooth highly reflective layer is applied to the substrate by printing.

17. The security document of claim 16, wherein the substrate is a plastic film and the smooth highly reflective layer is applied directly to the substrate to utilize the reflective properties of the film.

18. The security document of claim 16, wherein the substrate is a plastic film, the smooth highly reflective layer being applied over an opaque ink layer applied to the surface of the substrate.

19. The security document of claim 18, wherein the smooth highly reflective layer is printed on to the substrate.

20. The security document of claim 18, wherein the smooth highly reflective layer is applied to the substrate by a Gravure printing process.

21. The security document of claim 16, wherein the substrate is a paper film having a smooth surface to which said smooth highly reflective layer is applied.

22. The security document of claim 21, wherein the smooth highly reflective layer is applied to the substrate by a Gravure printing process.

23. The security document of claim 16, wherein the smooth highly reflective layer has a layer thickness of about 3 $\mu$m.

24. The security document of claim 1 or 2, wherein the raised printed image is applied by an Intaglio printing process.

25. A method of producing a security document including the steps of applying a smooth highly reflective layer to a substrate, said reflective layer having a reflectivity of at least 60 gloss units, and printing a raised printed image on the reflective layer, at least part of said raised printed having a height of at least 10 $\mu$m and being printed using ink of a hue having a chroma value of at least 30 chroma units and/or lightness of at least 50 L degrees.

26. The method of claim 25, said steps being modified to produce a document, wherein the raised printed image includes lines or dots which have an average height from about 10 $\mu$m to about 100 $\mu$m and a width of 10 $\mu$m to 100 $\mu$m, with the spacing or pitch between adjacent lines or dots being such that the ratio of height to pitch is from 1:1 to about 1:3.

27. A security device including a substrate, a smooth highly reflective layer applied to said substrate and having a reflectivity of at least 60 gloss units, and a raised printed image applied to said reflective layer by a printing process, at least part of said raised printed image having a height of at least 10 $\mu$m, said printed image being printed using ink of a hue having a chroma value of at least 30 chroma units and/or a lightness of at least 50 lightness units.

28. The security device of claim 27, wherein the raised printed image includes lines or dots which have an average height from about 10 $\mu$m to about 100 $\mu$m, a width from about 10 $\mu$m to about 100 $\mu$m, with the spacing or pitch between adjacent lines or dots being such that the ratio of height to pitch is from about 1:1 to about 1:3.

29. The security device of claim 28, wherein the raised printed image has an average height from about 20 to about 40 $\mu$m.

30. The security device of claim 27 or claim 28 wherein the hue chroma value of the ink used to print the printed image is in the range of 30 chroma units to about 60 chroma units.

31. The security device of claim 27 or claim 28, wherein the smooth highly reflective layer is restricted to a region or patch of the substrate to thereby define a region specific security feature in the document or device.

32. The security device of claim 27 or claim 28, wherein the smooth highly reflective layer is printed on the substrate.

33. The security device of claim 32, wherein the substrate is a plastic film and the smooth highly reflective layer is applied directly to the substrate.

34. The security device of claim 32, wherein the substrate is a plastic film having an opaque ink layer located on the surface of the substrate, and the smooth highly reflective layer is located on the opaque ink layer.

35. The security device of claim 32, wherein the substrate is formed of paper having a smooth surface to which said smooth highly reflective layer is applied.

36. The security device of claim 35, wherein the smooth highly reflective layer is printed on the substrate.

37. The security device of claim 27 or 28, wherein the raised printed image is an Intaglio printed image.

38. The security device of claim 32, wherein the smooth highly reflective layer has a layer thickness of about 3 $\mu$m.

39. A method of producing a security document or device, including the steps of applying a smooth highly reflective layer to a substrate, said reflective layer having a reflectivity of at least 60 gloss units, and printing a raised printed image on the reflective layer, at least part of said raised printed having a height of at least 10 $\mu$m and being printed using ink of a hue having a chroma value of at least 30 chroma units and/or lightness of at least 50 L degrees.

40. The method of claim 39, said steps being modified to produce a document wherein the raised printed image includes lines or dots which have an average height from about 10 $\mu$m to about 100 $\mu$m, and a width of about 10 $\mu$m to about 100 $\mu$m, with the spacing or pitch between adjacent lines or dots being such that the ratio of height to pitch is from 1:1 to about 1:3.

* * * * *

UNITED STATES PATENT AND TRADEMARK OFFICE

CERTIFICATE OF CORRECTION

PATENT NO. : 6,605,338 B1 
DATED : August 12, 2003
INVENTOR(S) : H. Romanic et al.

It is certified that error appears in the above-identified patent and that said Letters Patent is hereby corrected as shown below:

Column 6,
Line 10, "claim 1" should read -- claim 1, --
Line 12, "110 $\mu$m a width" should read -- 110 $\mu$m, and a width --

Column 7,
Line 10, "or 2," should read -- or claim 2, --
Line 17, "said raised printed having" should read -- said raised printed image having --
Line 38, "110 $\mu$m, a width" should read -- 110 $\mu$m, and a width --

Column 8,
Line 1, "claim 28" should read -- claim 28, --
Line 24, "or 28," should read -- or claim 28, --
Line 32, "said raised printed" should read -- said raised printed image --

Signed and Sealed this

Fifth Day of April, 2005

JON W. DUDAS
*Director of the United States Patent and Trademark Office*